Sept. 30, 1969     A. A. GIUFFRE     3,469,412

HUMIDITY AND TEMPERATURE CONTROL APPARATUS

Filed Nov. 9, 1967     4 Sheets-Sheet 1

Inventor
Anthony A. Giuffre
By Mann, Brown and McWilliams
Attys.

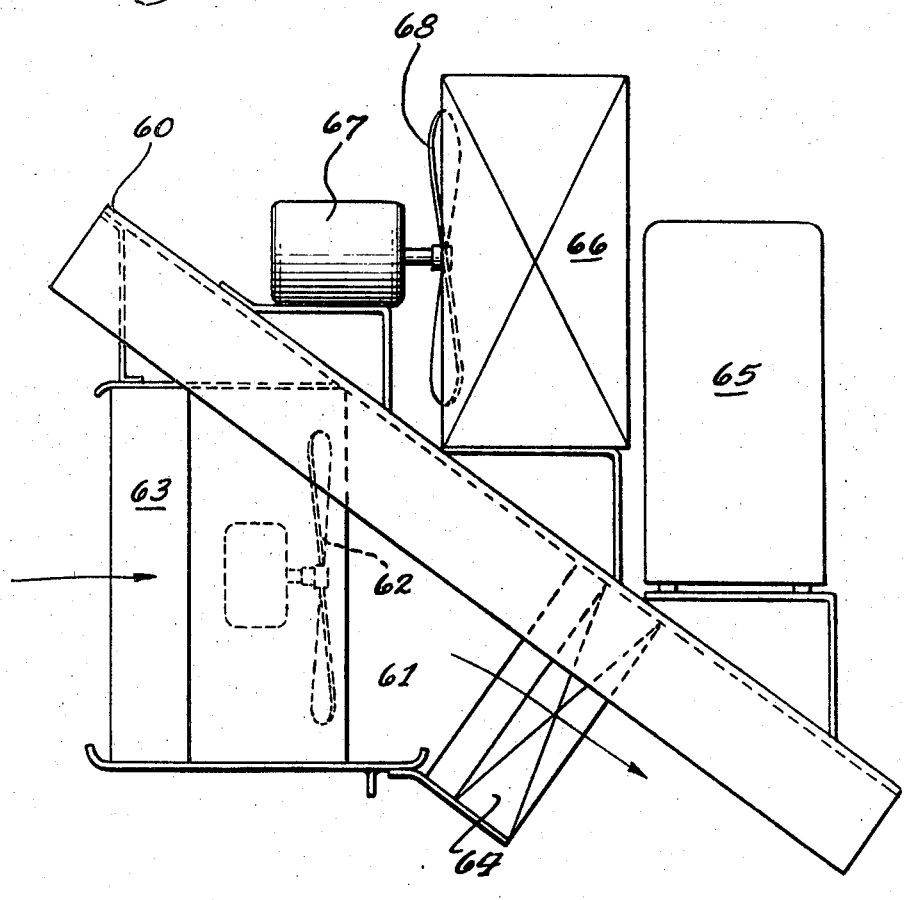

United States Patent Office 3,469,412
Patented Sept. 30, 1969

3,469,412
HUMIDITY AND TEMPERATURE CONTROL
APPARATUS
Anthony A. Giuffre, 4344 N. 70th St.,
Milwaukee, Wis. 53216
Filed Nov. 9, 1967, Ser. No. 681,656
Int. Cl. F24f 1/02, 11/08
U.S. Cl. 62—173                                  10 Claims

ABSTRACT OF THE DISCLOSURE

Humidity and temperature control apparatus arranged so that air to be conditioned is first passed by an evaporator and then into heat exchange relation with a condenser so that the evaporator first cools and dehumidifies the air while the condenser in the air flow path heats up the air before returning it to the space being conditioned. A control system is used with a second condenser so as to bypass the first condenser when heat is not needed. A humidistat and a thermostat control the operation of the compressor.

---

The present invention is directed to new and useful improvements in temperature and humidity controlling apparatus for use with building spaces, an example of which is a grain silo.

The desirability of controlling both the humidity and temperature of a building space has long been recognized. The present invention has for its major purposes to provide temperature control, circulation of air, and control of humidity of the air in circulation in such manner that the system may be economically applied to a grain silo for purposes of avoiding spoilage of the gran within the silo, thus enabling storage of grain and eventual sale of the grain at a relatively higher market price, although the system may be used for conditioning the temperature, flow, and humidity of air circulated to and from other building spaces.

These and other purposes will appear from time to time in the course of the ensuing specification and claims, when taken in connection with the accompanying drawings, in which:

FIGURE 4 is a side view of modified apparatus which incorporates the general principles of the invention.

Figure 1:
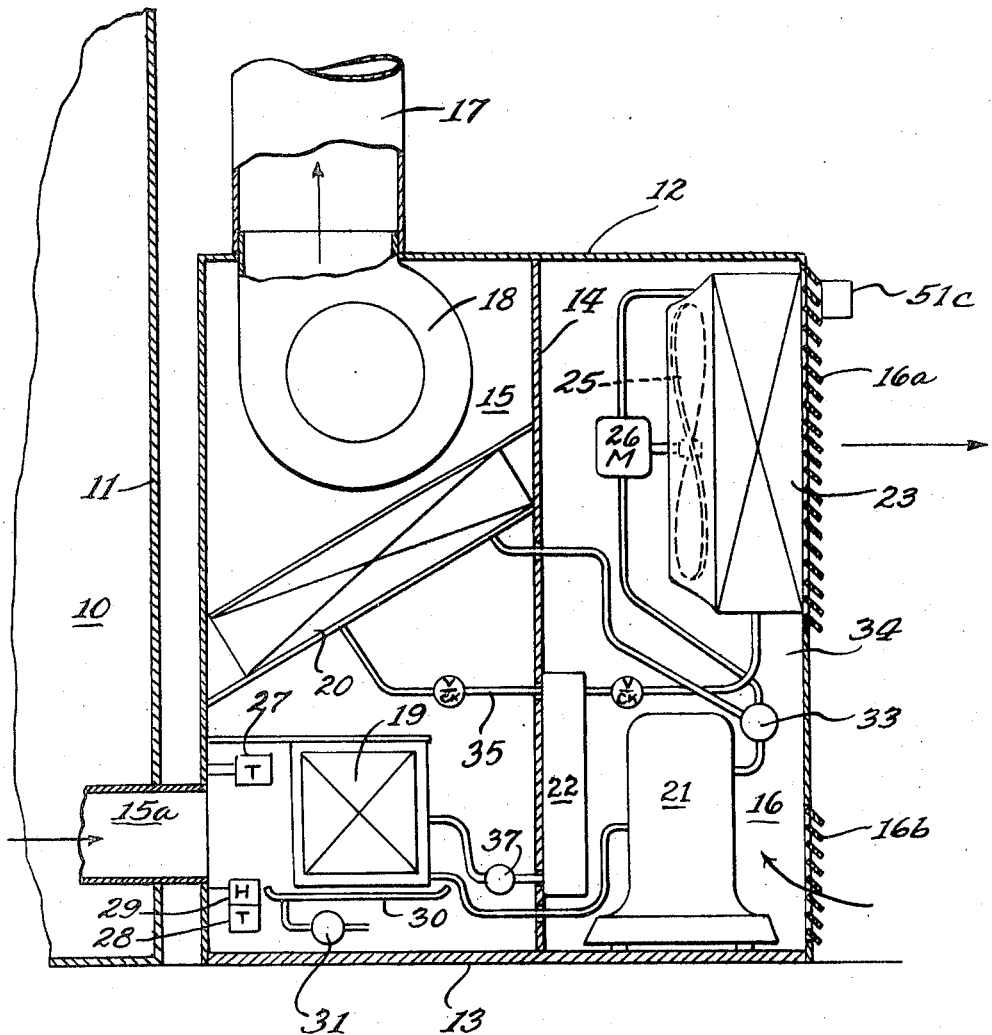
FIGURE 1 is a diagrammatic sectional view of a typical housing utilized with the invention to condition air.

With specific reference now to the drawings, and in the first instance to Figure 1, numeral 10 designates a building space which is to be conditioned through use of the present invention. Building space 10 may be taken as representative of the space within a silo having an upstanding sidewall 11. A housing 12 containing the conditioning system may be supported on the ground level next to the silo. The housing 12 includes a base 13 and an interior partition wall 14 which divides the housing into two spaces 15 and 16. Space 15 is in communication with the silo through an air inlet duct 15a and an air return duct 17. Air return duct 17 may lead to the top of the silo while the inlet duct 15a is connected to a lower portion of the silo. A fan or blower 18 is adapted to maintain circulation of air from the inlet 16 through the space 15, through return duct 17, and through the space 10 being conditioned. Space 16 is in communication with exterior air through upper and lower grilled or lowered openings 16a and 16b.

In accordance with the invention, an evaporator 19 is positioned in the path of the incoming air from inlet duct 15a. A condenser 20 is disposed across the space 15 and in the path of the flow of air from the evaporator 19 to the blower 18. Space 16 serves to house a compressor 21, receiver 22, and a second condenser 23. The second condenser 23 is positioned next to a discharge opening 16a in housing 12 so that a fan 25 driven by a suitable motor 26 may drive heat from the condenser 23 to the space exterior to housing 12. A first thermostat 27 and second thermostat 28 are positioned in the path of the incoming air through duct 15a and a humidistat 29 is in the path of the incoming air from duct 15a. A pan or trough 30 may be positioned beneath evaporator 19 so as to collect water from the air. A condensate removal pump 31 may be used to discharge the condensed moisture from the tray 30.

Figure 2:
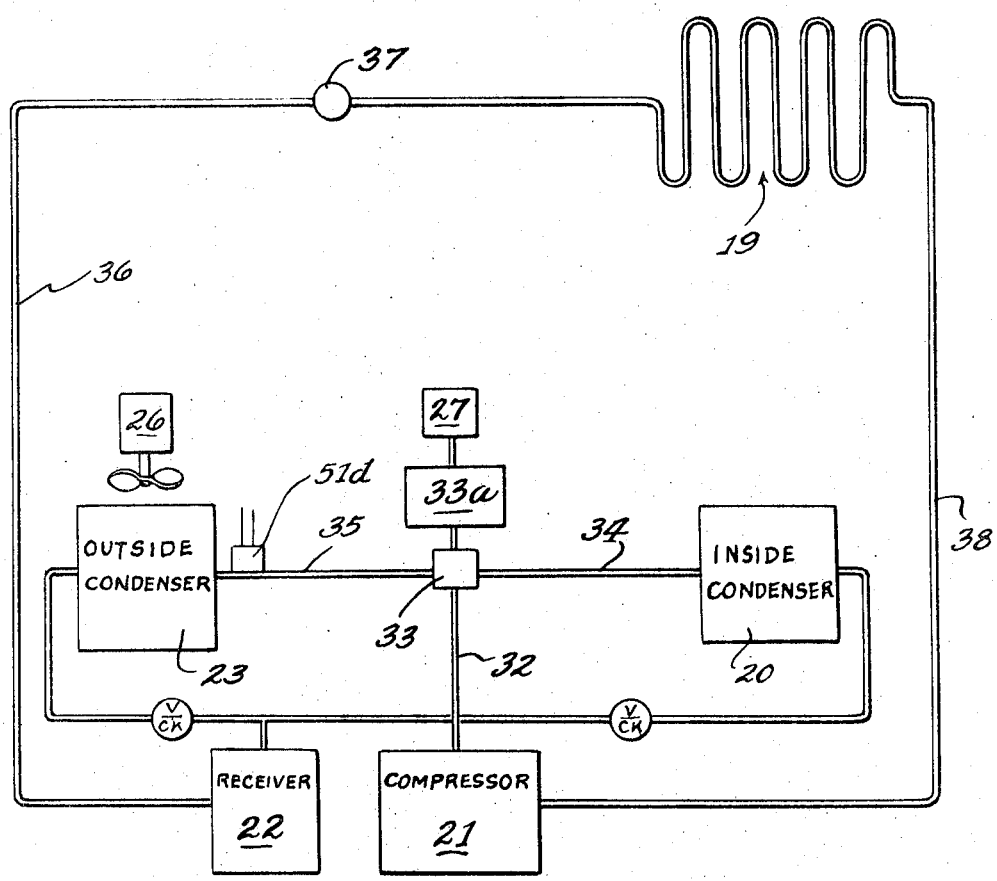
FIGURE 2 is a digrammatic layout of the refrigerant cycling system utilized in the apparatus of FIGURE 1.

The refrigerant system is connected as is shown in FIGURE 2. In FIGURE 2, for example, compressor 21 is adapted to deliver a suitable refrigerant through line 32 to a three-way valve 33 which is controlled by thermostat 27. Valve 33 may be a solenoid controlled valve which selectively delivers refrigerant through line 34 to the first condenser 20 or through line 35 to the second condenser 23. Receiver 22 receives the refrigerant from either condenser connected in the line and delivers the same through line 36 to expansion valve 37 and thence to the evaporator 19 from where it is returned through line 38 to compressor 21.

Figure 3:
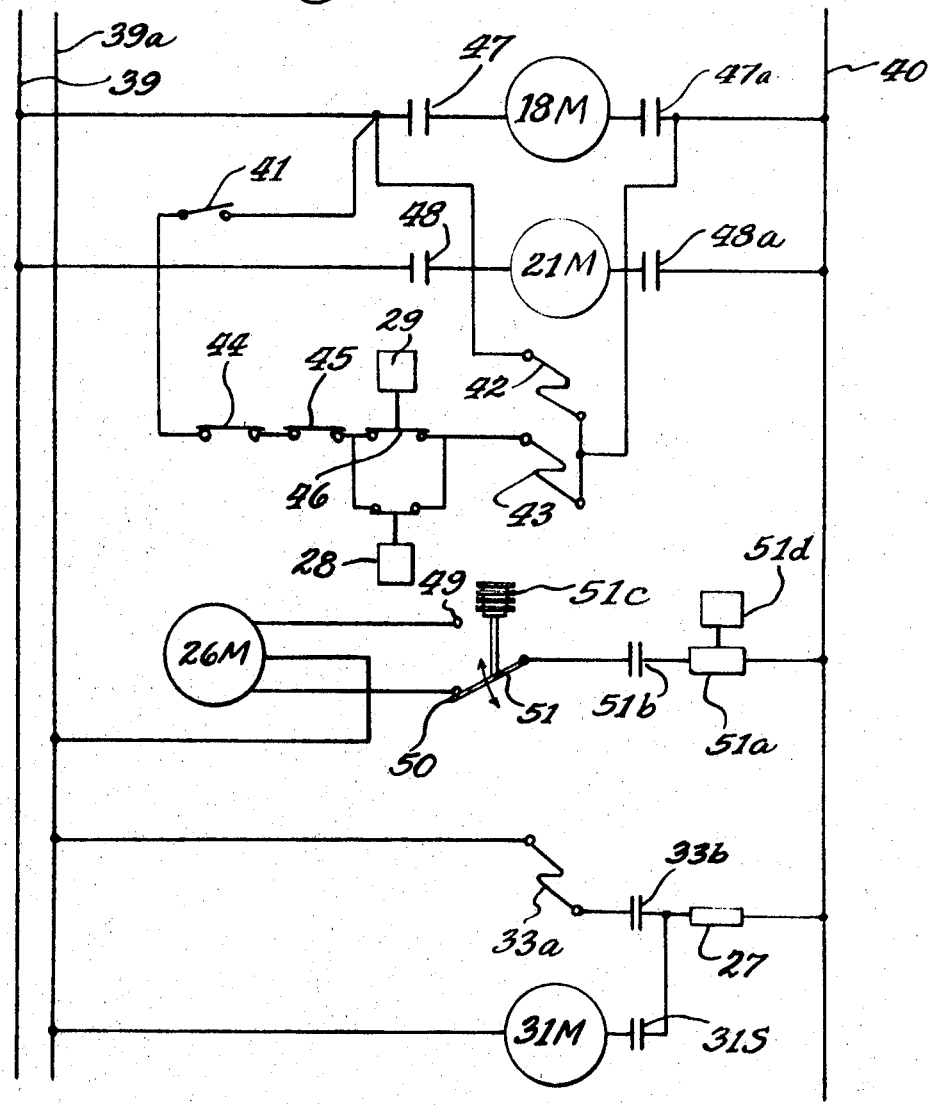
FIGURE 3 is a diagrammatic view of the electrical control system used with the refrigerant cycling system of FIGURE 2.

The system is controlled by means of the electrical circuit illustrated in FIGURE 3. In FIGURE 3, for example, motor 18m is connected across power supply lines 39 and 40 and may be used for driving blower 18 for purposes of inducing air flow and extracting heat from the surrounding air. Motor 21m is also connected across the lines and is used for driving the compressor 21. An on-off switch 41 is in a starting line leading to starting coils 42 and 43 for the motors 18m and 21m, respectively. The starting coil lines are also controlled by high and low speed switches 44 and 45. A switch 46 is operated by humidistat 29. A second switch 46a is in parallel with switch 46 and is operated by the thermostat 28. Switches 47 and 47a are relay contact switches in the lines to motor 19m and are closed when the starting coil 42 for motor 19m is energized. Switches 48 and 48a in the lines to motor 21m are relay operated switches which are closed when the starter coil 43 for motor 21m is energized.

A fan motor 26m for the fan 26 is connected across lower voltage lines 40 and 39a and is a two-speed motor with a high speed circuit making contact 49 and a low speed circuit making contact 50 under control of a switch 51. Switch 51 is controlled by a coil 51a which is in turn controlled by a thermostat 51d which is on the inlet line of the condenser 23. An air temperature sensing device 51c such as a bellows type of device is connected to switch 51 to move it to the high speed contact 49 when the temperature of the air leaving the condenser rises.

An operating coil 33a for the valve 33 is energized through closure of switch 33b which is in turn controlled by thermostatic element 27. Thermostatic element 27 maintains valve 33 in a position which delivers refrigerant from compressor 21 to condenser 20, as long as the temperature of the incoming air stream through duct 16 is at a predetermined low level or below. When the temperature rises, thermostatic element 27 operates valve 33 to cut off the flow of refrigerant to condenser 20 and to divert flow of refrigerant to condenser 23.

Motor 31m for the condensate removal pump 31 is connected across lower voltage lines 39a and 40 and is controlled by a float switch 31s so that the pump is operated whenever the level of liquid in the pan 30 rises to a predetermined amount.

The principles of the invention may also be applied to a smaller form of unit while using the same basic refrigerant cycling system illustrated in FIGURE 2, and the same control system illustrated in FIGURE 3. In FIGURE 4, for example, a building panel 60 may be shaped to fit in a matching opening cut in the side or roof of a building space such as a silo. On the inside of this building panel 60 ductwork 61 establishes a passageway in communication with the interior of the building space. This ductwork 61 has a fan 62 mounted therein so as to pull air through the duct in the direction indicated. The upstream side of the duct carries the evaporator coil 63, while the downstream side of the duct carries a condenser 64.

The other side of the building panel 60, which is exposed to the outside of the building space, carries the compressor 65 and its driving motor, a receiver (not shown), and a second condenser 66. A motor 67 drives a fan 68 to direct air past the condenser 66.

Condenser 64 is connected to the refrigerant cycling system, as is condenser 20 in FIGURE 2, while condenser 66 is connected to the system in the manner of condenser 23 in FIGURE 2. Flow of refrigerant to one or the other of the condensers is under control of a three-way valve as illustrated and described in connection with valve 33 of FIGURE 2.

The system as shown can be applied to grain silos where it is desired to remove heat from the silo and also to keep the relative humidity within the silo to a relatively low value. In this regard the silo when filled with grain will build up heat to well in excess of 100 degrees F. when the outside temperature may be something on the order of 60–80 degrees. High temperatures are undesirable because they tend to produce germination of the grain, and cause the grain to lose many of its chemical and nutrient values. High humidities are undesirable for the same reasons. If the system is applied to an existing silo, air is maintained in circulation to and from the silo as by means of blower 18 which operates independently of the control systems for the refrigerant cycling unit. The system may be set so that the refrigerant cycling system is off as long as the temperature and humidity within the silo are at predetermined low values.

If the humidity rises to a preselected high value, for example 60 to 70 percent, the humidistat 29 closes the switch 46 to energize the motor which drives the compressor and evaporator fan motor 18m. The refrigerant then passes to the evaporator 19 which is in the path of air flow within the duct means communicating with the top and bottom of the silo. The air in circulation thus passes the evaporator where the air is cooled and water is extracted from it. The water may collect in the receptacle 30. The air is thus constantly circulated through the grain in the silo and then past the evaporator where the heat picked up by the air when passing the grain is lost by heat transfer with the evaporator. As long as the temperature of the circulating air is above a preselected value, for example 40 to 45 degrees Fahrenheit, thermostat 27 keeps coil 33a de-energized which puts outside condenser 23 in the refrigerant cycling line. If the thermostat 51d senses a predetermined high temperature, for example 100 degrees Fahrenheit, it actuates switch 51b to run the condenser fan motor 26m at low speed to increase the extraction of heat from condenser 23. When the temperature of the air discharged from condenser 23 reaches a predetermined value, for example 105 degrees Fahrenheit, switch 51 is moved to the high speed contact.

If the continued operation of the refrigerant cycling system, as demanded by the humidistat, causes a reduction in temperature below a preselected low value as aforementioned, then thermostat 27 causes operation of solenoid 33a to cut out the outside condenser 23 from the refrigerant return line while connecting condenser 20 to the refrigerant return line. This causes the air in circulation to be heated by condenser 20 after it has been cooled by evaporator 19 and before the air is returned to the silo. In theory, the heat supplied by the condenser may be on the order of the heat extracted by the evaporator so that when the system is operating in this fashion, water is extracted from the air in circulation while the temperature of the air entering the silo is something on the order of the air leaving the silo (neglecting temperature variations in the conduit means exterior to the silo proper).

Whenever the temperature of the incoming air rises above a preselected value, for example 70 degrees Fahrenheit, thermostat 28 starts operation of the system irrespective of humidity conditions.

The heat that is produced in either condenser is of course due to the heat of compression from the compressor plus the heat removed by the evaporator which is normal in the evaporation process.

The system of FIGURE 4 uses the same principles as that found in the system in FIGURE 1. The system of FIGURE 4 is especially adapted for relatively small spaces which are to be conditioned. In this case the system as a whole is mounted on and supported on the panel 60 which is adapted to form part of the building structure defining the space to be conditioned. An opening in the wall or roof of the space being conditioned is cut to match the size of the panel 60 or to approximate the size of this panel so as to enable mounting of the compressor, evaporator, and first condenser on one side of the panel within the building space while the other side of the panel which carries the other condenser, is positioned exterior to the building space. Thus, this system is easily and quickly installed. The principles of FIGURE 4 may of course be incoprated so as to fit a window opening of a builidng space with the one condenser being positioned exterior to the building space while the other components are positioned within the building space being conditioned in the manner aforesaid.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention shoud be limited only by the scope of the hereinafter appended claims.

I claim:

1. Apparatus for controlling the temperature and humidity of a building space including duct means defining an air flow space and formed and adapted for connection with a building space so as to allow communication of air from the building space to and from said duct means, means for inducing flow of air through said duct means in one direction, refrigerating means including an evaporator, compressor, and condenser means connected by refrigerant supply and return lines, said condenser means including two condensers connected in the line to the compressor, one of said condensers being located within said duct means and the other of said condensers being located outside of and exterior to said duct means, said evaporator being positioned within said duct means on the upstream side of said one condenser with respect to the direction of air flow through said duct means, temperature responsive control valve means connected to the lines connecting said condensers and formed and adapted to connect said one condenser in the refrigerant cycling line in response to a predetermined minimum temperature within said building space while connecting the other of said condensers in said line in response to attainment of a temperature within said building space in excess of said minimum temperature, said control means being formed and adapted to cut out one or the other of said condensers altogether from said line when the other of said condensers is connected to said return line, and humidity responsive control means for causing periodic operation of said compressor in response to attainment of a preselected humidity or more in said flow of air.

2. The apparatus as set forth in claim 1 wherein a receiver is in the line between said evaporator and said two condensers, and an expansion valve is in the line between said evaporator and said receiver.

3. Apparatus as set forth in claim 1 wherein said temperature responsive means is in the form of a thermostat and a three-way valve controlled by said thermostat for alternately connecting one or the other of said condensers in said line.

4. The structure of claim 1 wherein said duct means and said one condenser are supported on a building panel on one side thereof and the other condenser and compressor are supported on the other side of said building panel.

5. The structure of claim 1 wherein said duct means is connected to a grain silo and the upstream side of said duct means is connected to the bottom of said silo, and the downstream side of said duct means is connected to the top of a grain silo.

6. The structure of claim 1 wherein said duct means is formed within a refrigerant unit housing, and said housing includes partition means between said duct means and a space enclosing said other condenser and said compressor, and blower means are used to circulate air past said second condenser and to the exterior of said housing.

7. The system of claim 1 characterized by and including a fan for circulating air past said other condenser to exterior air and temperature responsive multi-speed control means for operating said fan at high and low speeds in response to high and low temperatures, respectively, in said duct means.

8. The structure of claim 1 wherein said means for causing flow of air in said duct means is maintained in operation independently of said refrigerant control means.

9. The structure of claim 1 characterized by and including temperature responsive control means for causing periodic operation of said compressor independently of said humidity responsive control means and in response to attainment of a preselected temperature or more in said flow of air.

10. The structure of claim 1 characterized by and including temperature responsive means for sensing the temperature of refrigerant supplied to said other condenser, fan means associated with said other condenser for operation at a selected speed to thereby induce flow of air past said other condenser to the exterior in response to attainment of a predetermined temperature in said refrigerant line, and means for operating said fan means at a higher speed of operation than said selected speed in response to attainment of a preselected temperature or more in the flow of air past said other condenser.

References Cited

UNITED STATES PATENTS

| | | | |
|---|---|---|---|
| 3,012,411 | 12/1961 | Kjellman | 62—173 |
| 3,203,196 | 8/1965 | Mullsoff | 62—173 |
| 3,264,840 | 8/1966 | Harnish | 62—173 |

WILLIAM J. WYE, Primary Examiner

U.S. Cl. X.R.

62—203, 263, 176, 181